Figure 1:
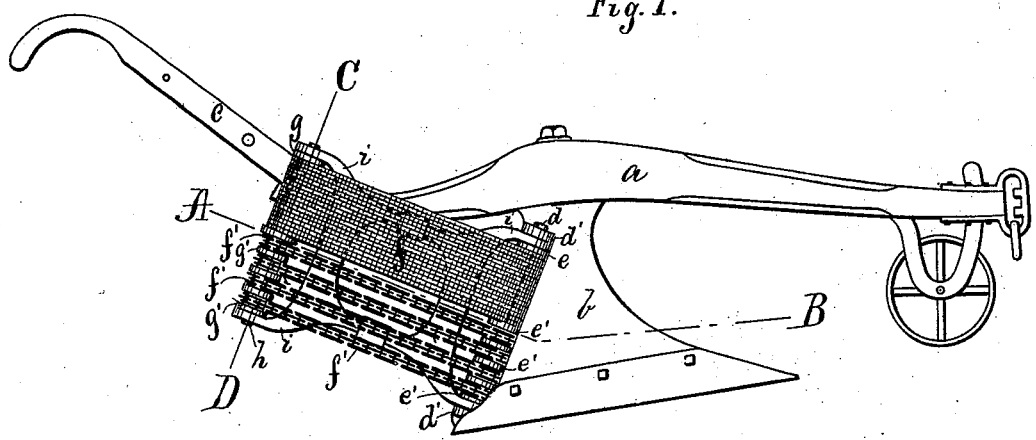

T. E. JEFFERSON.
Plow.

No. 210,201.   Patented Nov. 26, 1878.

Witnesses:
Henry Chadbourn
F. Allen

Inventor:
Thomas E. Jefferson
by Abra Andrew
his atty

UNITED STATES PATENT OFFICE.

THOMAS E. JEFFERSON, OF BOSTON, MASSACHUSETTS.

IMPROVEMENT IN PLOWS.

Specification forming part of Letters Patent No. 210,201, dated November 26, 1878; application filed October 7, 1878.

*To all whom it may concern:*

Be it known that I, THOMAS E. JEFFERSON, of Boston, in the county of Suffolk and State of Massachusetts, have invented certain new and useful Improvements in Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements on plows for the purpose of lessening the friction in turning over the sods or soil; and this my invention consists in a plow provided with a mold-board composed of two or more loosely-revolving rollers, over which is located an endless anti-frictional apron, that is kept in a continuous motion over the rollers during the progress of the plow through the earth. The said apron may be made in one or more pieces, and may be made in the shape of one wide chain-belt, or in the shape of a number of chains, one located above the others on the rollers. The said endless apron may be made of any suitable materials—such as, for instance, metallic endless chains, wire-cloth, or yielding materials of any kinds, as may be desirable; and I wish here to state that I do not confine myself to any particular shape of the rollers, or any particular construction of the endless apron, as the gist of my invention consists of a plow mold-board composed of an endless anti-frictional apron supported on two or more loosely-revolving rollers.

The said endless apron may be of any desired length—that is, it may project in part or whole to the very point of the plow, or terminate more or less from the said point or forward end, as may be desirable. When a number of independent endless chains are used, I may prefer to make the lower ones longer, and extending nearer to the point or forward end of the plow than the upper ones, in which case a separate roller would have to be used for each chain, or for two or more chains, in the forward end of the plow. In a similar manner separate rollers would be employed at the rear of the plow, if the upper part of the rear end of the endless apron is made extended farther to the rear than the lower part.

The pins or bolts around which the front and rear rollers rotate are connected together by means of a suitable frame, or stay or stays; and I prefer to make such frame or stay rigid, so as to obtain great strength, combined with lightness; but, if desired, the said stay or frame may be made adjustable to and from the rollers and their bolts, for the purpose of properly tightening the endless apron or aprons in case they should become slack in use.

Figure 3:
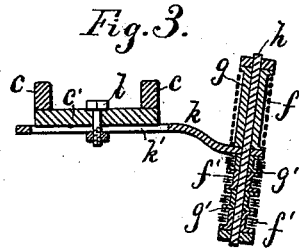
Figure 2:
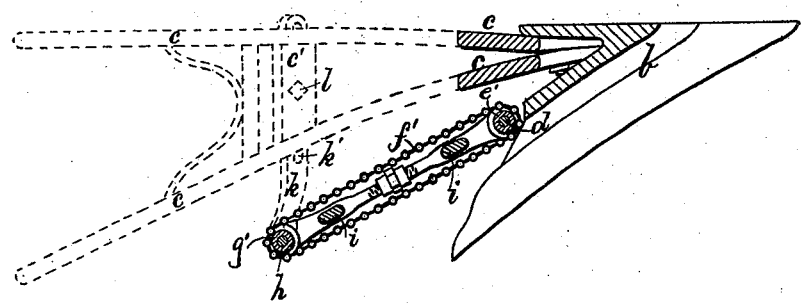

On the accompanying drawings, Figure 1 represents a side elevation of a plow provided with my invention. Fig. 2 represents a section on the line A B, shown in Fig. 1; and Fig. 3 represents a cross-section on the line C D, also shown in Fig. 1.

Similar letters refer to similar parts wherever they occur on the different parts of the drawings.

$a$ represents the beam of the plow, on which $b$ is the plowshare, and $c\ c$ the handles or stilts, as usual. $d$ is a bolt or pin, secured in bearings $d'\ d'$, attached to the plowshare $b$. On the pin or bolt $d$ is located one or more loosely-revolving rollers, $e\ e'\ e'$, as shown. $f\ f'\ f'$ represent the endless apron, supported in the forward end on the rollers $e\ e'\ e'$, and in the rear on similar rollers, $g\ g'\ g'$, that are loosely revolving on the pin or bolt $h$. $i$ is the frame or stay connecting the pins $d$ and $h$, for the purpose set forth.

$k$ is the bar or rod jointed to the rear pin, $h$, which bar is provided with a slot-hole, $k'$, or a number of bolt-holes. $l$ is a set-screw, or screw passing through the slot-hole $k'$ and the stationary part $c'$, by means of which the bar $k$ is held firmly in any desired position, according to the more or less extended position of the rear part of the apron or belt $f\ f'\ f'$, as described.

The upper part, $f$, of the endless apron is shown in the drawing as a wide belt or band. The lower part, $f'\ f'$, of said endless apron is shown as a number of endless chains or belts, it being immaterial whether one or more endless belts, bands, or chains are used.

The rotary rollers $e\ e'\ g\ g'$ serve only for the purpose of carrying and supporting the endless traveling belt, band, or apron $f\ f'\ f'$, but do not serve as anti-frictional rollers for immediate contact with the soil through which the plow is driven.

Having thus fully described the nature, construction, and operation of my invention, I wish to secure by Letters Patent, and claim—

1. A plow provided with a mold-board consisting of one or more endless traveling belts, chains, or bands, $f\ f'\ f'$, and two or more rotary rollers, $e\ e'\ g\ g'$, as and for the purpose set forth.

2. In a plow, the combination of the endless apron $f\ f'\ f'$, supporting-rollers $e\ e'\ g\ g'$, stay or stays $i\ i$, and adjustable brace or support $k$, as and for the purpose set forth and described.

In testimony that I claim the foregoing as my own invention I have affixed my signature in presence of two witnesses.

THOMAS E. JEFFERSON.

Witnesses:
 ALBAN ANDRÉN,
 HENRY CHADBOURN.